(12) United States Patent
Yang

(10) Patent No.: US 8,354,182 B2
(45) Date of Patent: Jan. 15, 2013

(54) BATTERY BOX AND ELECTRONIC DEVICE USING THE SAME

(75) Inventor: Li-Jun Yang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 397 days.

(21) Appl. No.: 12/841,124

(22) Filed: Jul. 21, 2010

(65) Prior Publication Data

US 2011/0236738 A1    Sep. 29, 2011

(30) Foreign Application Priority Data

Mar. 26, 2010   (CN) ............. 2010 1 0133526

(51) Int. Cl.
*H01M 2/10* (2006.01)
(52) U.S. Cl. .................. 429/97; 429/100
(58) Field of Classification Search ........... 429/96–100
See application file for complete search history.

(56) References Cited

U.S. PATENT DOCUMENTS

| | | | | |
|---|---|---|---|---|
| 5,395,263 A | * | 3/1995 | Sandell | 439/500 |
| 6,730,432 B1 | * | 5/2004 | Grosfeld et al. | 429/97 |
| 2004/0264955 A1 | * | 12/2004 | Fujii | 396/448 |

* cited by examiner

*Primary Examiner* — Milton I Cano
*Assistant Examiner* — Carmen Lyles-Irving
(74) *Attorney, Agent, or Firm* — Altis Law Group, Inc.

(57) ABSTRACT

The present disclosure provides a battery box including a main body and a battery mounting mechanism. The main body defines a battery cavity to receive a battery and includes a sidewall defining a first receiving space and a second receiving space. The mechanism includes a fixing member, a shaft, and an elastic member. Two ends of the shaft are fixed in the first receiving space, and the end adjacent to the second receiving space is nearer to the battery cavity than the other end. The fixing member rotates relative to the shaft and adjacent to the second receiving space. A portion of the fixing member is received in the battery cavity. The elastic member is perpendicularly received in the second receiving space and can be compressed due to the rotation of the fixing member. An electronic device using the battery box is also provided.

12 Claims, 7 Drawing Sheets

BATTERY BOX AND ELECTRONIC DEVICE USING THE SAME

BACKGROUND

1. Technical Field

The present disclosure relates to battery boxes and electronic devices and, particularly, to an electronic device using a battery box.

2. Description of Related Art

A conventional battery box includes a cover and a main body. A hook protrudes from the cover, and a latching slot is defined in the main body. The hook cooperates with the latching slot to latch the cover to the main body to fix a battery received in the main body. A button is further mounted on the battery box. When the button is depressed, the hook disengages from the latching slot. The battery box can be thus opened and the battery may pop out from the battery box. One problem with this battery box is that the button can be accidentally pressed and the battery disengaged from the battery box, even causing damage to an electronic device.

BRIEF DESCRIPTION OF THE DRAWINGS

The components of the drawings are not necessarily drawn to scale, the emphasis instead being placed upon clearly illustrating the principles of a battery box and an electronic device using the same. Moreover, in the drawings, like reference numerals designate corresponding parts throughout several views.

DETAILED DESCRIPTION

Figure 1:
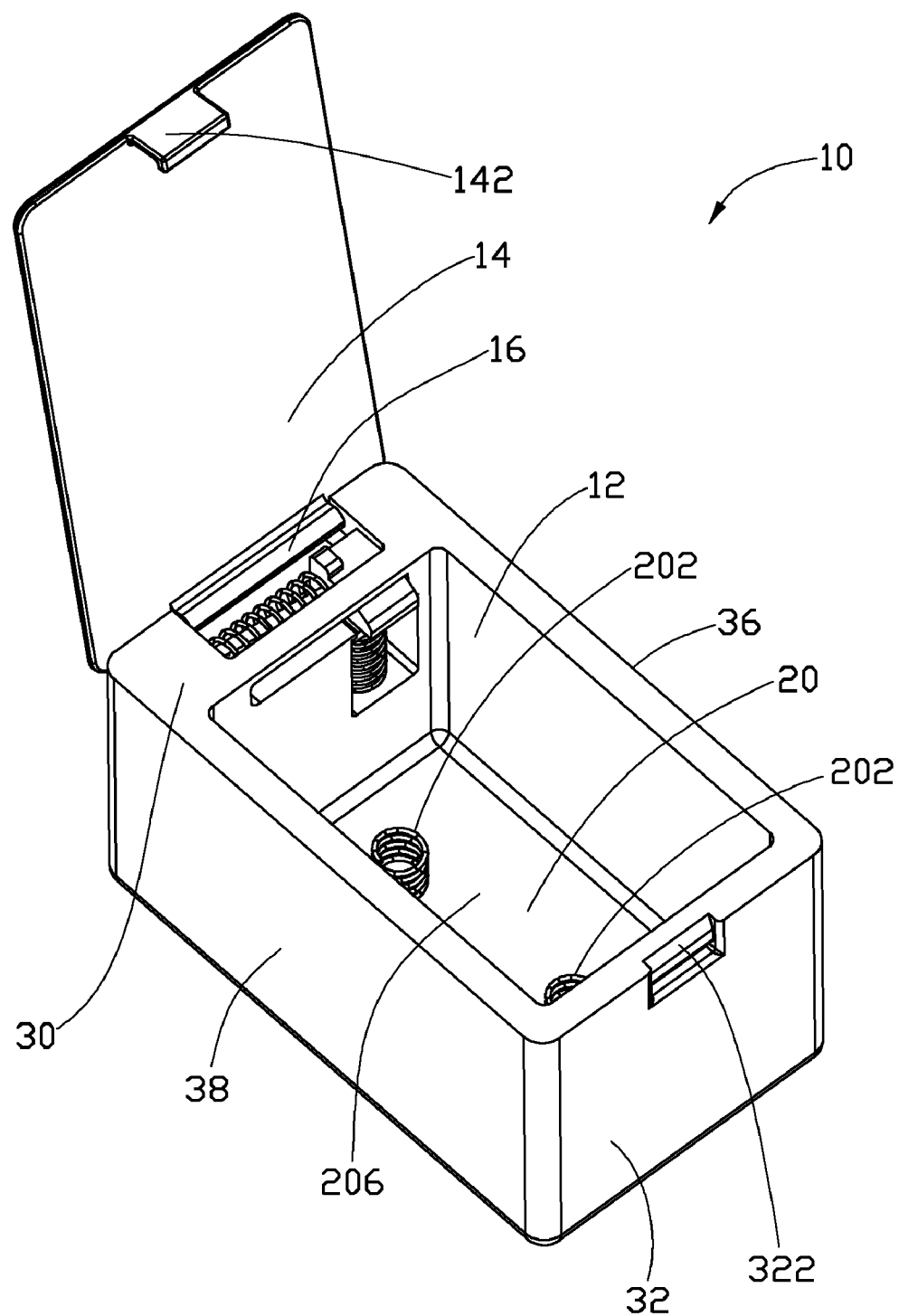
FIG. 1 is an isometric view of a battery box in accordance with an exemplary embodiment, showing the battery box in an open state.

Referring to FIG. 1, an embodiment of a battery box 10 is illustrated. The battery box 10 includes a main body 12, a cover 14, and a shaft 16. The cover 14 is rotatably connected to the main body 12 via the shaft 16.

A hook 142 protrudes from a free end of the cover 14. The hook 142 is employed to latch the cover 14 to the main body 12.

Figure 5:
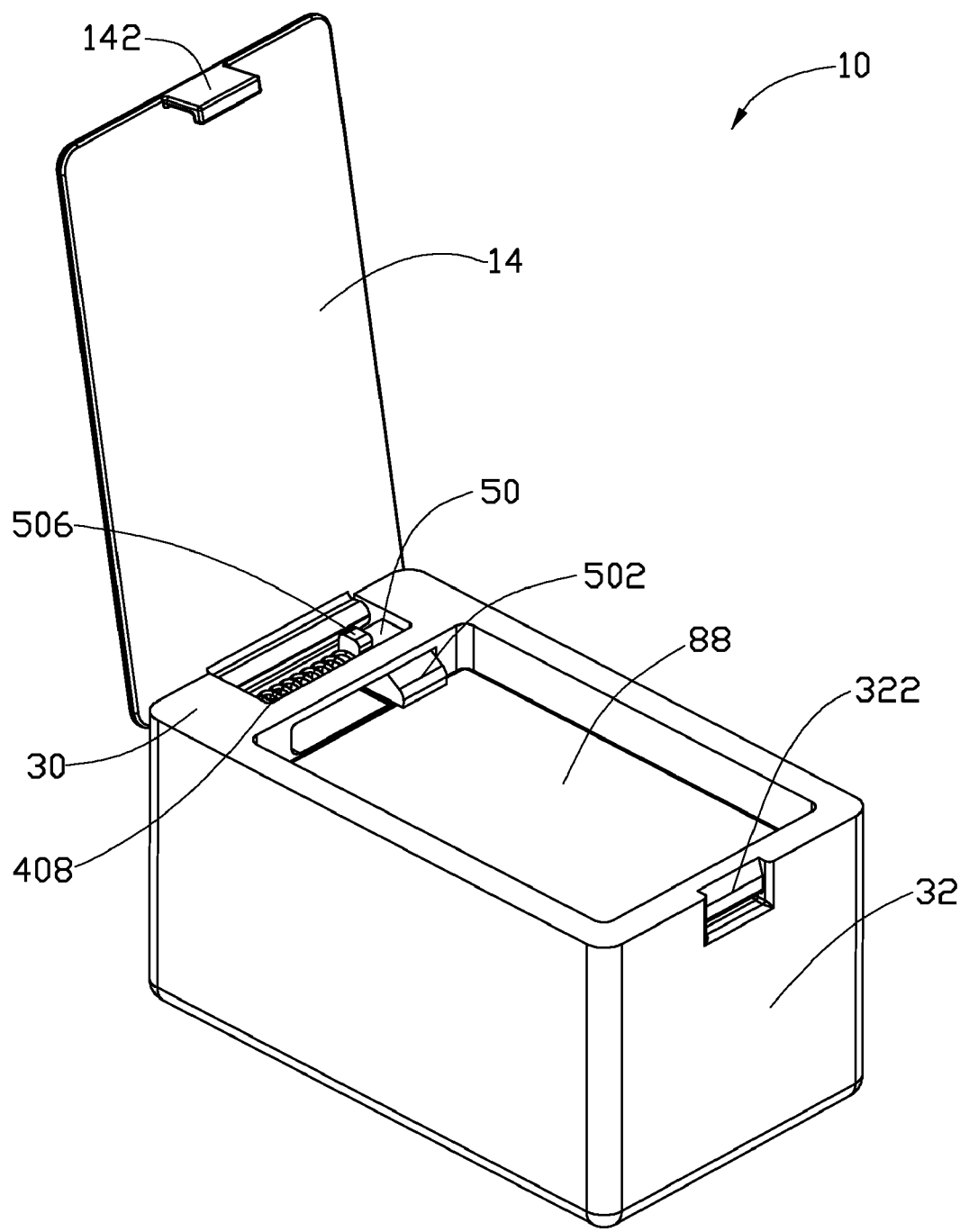
FIG. 5 is an isometric view of the battery box of FIG. 1, showing a battery fixed in the main body by the battery mounting mechanism.

The main body 12 includes a bottom 20 and four sidewalls 30, 32, 36, and 38 perpendicularly secured to the bottom 20. A pair of elastic members 202 is perpendicularly mounted on the bottom 20. In this embodiment, the elastic members 202 are coil springs. The four sidewalls 30, 32, 36, and 38 cooperatively form a battery cavity 206 to receive a battery 88 (see FIG. 5). The sidewall 30 is parallel to the sidewall 32, and the sidewall 36 to the sidewall 38.

Figure 2:
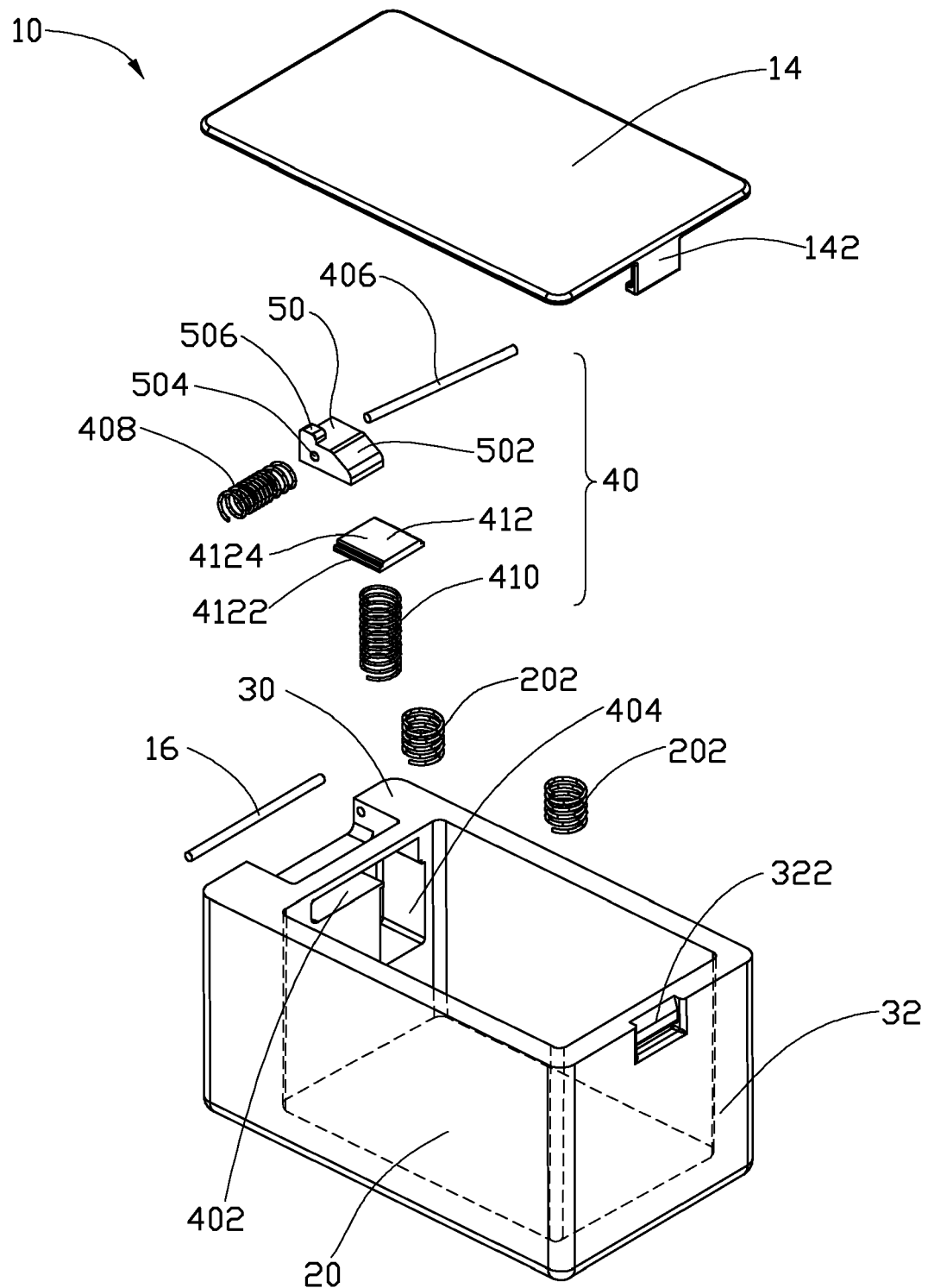
FIG. 2 is an exploded, perspective view of the battery box of FIG. 1.
Figure 3:
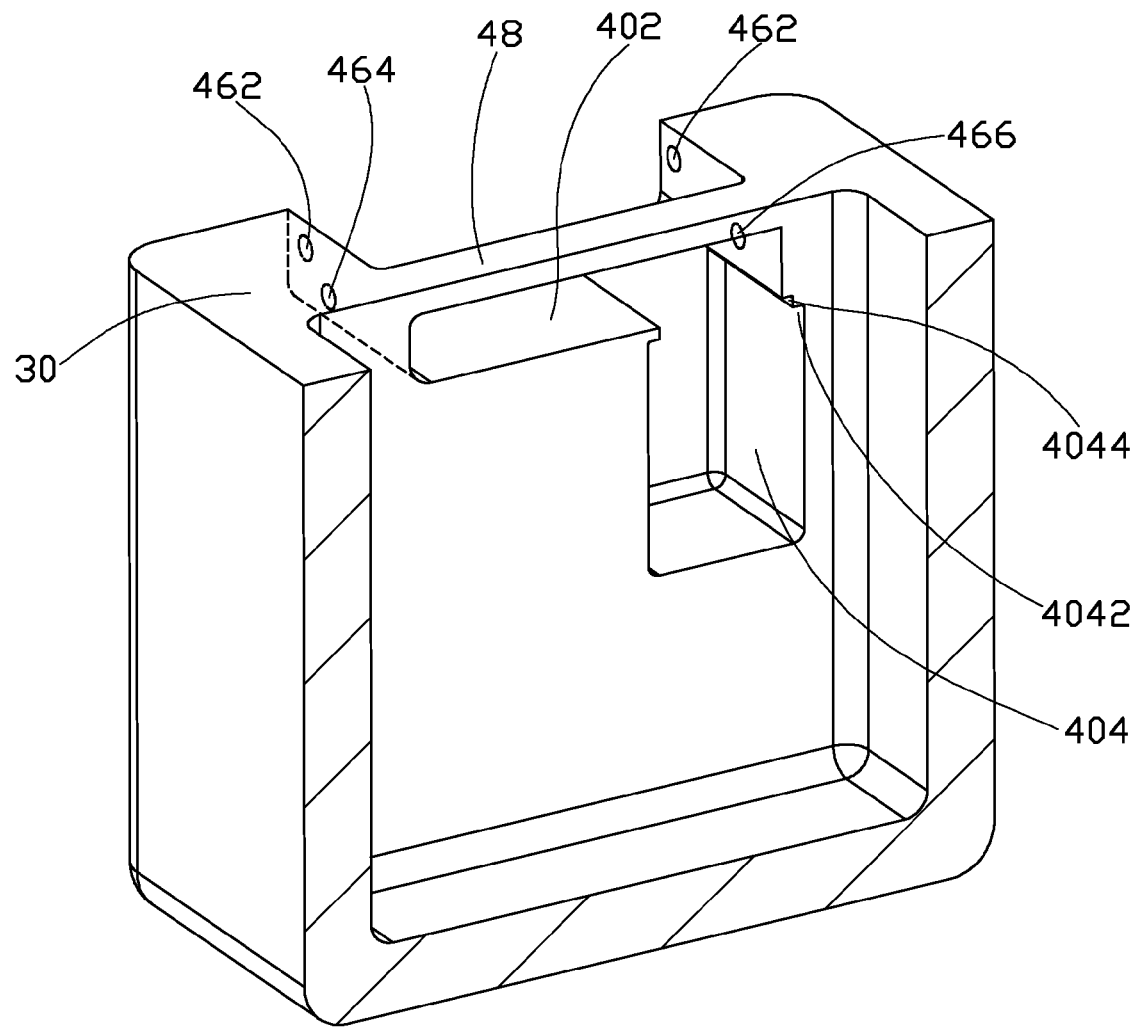
FIG. 3 is a cut-away view of a main body of the battery box of FIG. 1.

Referring also to FIGS. 2-3, the sidewall 30 defines a first receiving space 402 and a second receiving space 404 communicating with the first receiving space 402. The first receiving space 402 is substantially parallel to the bottom 20, and the second receiving space 404 is substantially perpendicular to the bottom 20. Each of two opposite sidewalls of the first receiving space 402 defines a first fixing hole 462. Opposite ends of the shaft 16 are respectively received in the first fixing holes 462 to rotatably connect the cover 14 to the main body 12. The two opposite sidewalls of the first receiving space 402 further respectively define a second fixing hole 464 and a third fixing hole 466. The second fixing hole 464 and the third fixing hole 466 are nearer to the battery cavity 206 than the first fixing holes 462. The third fixing hole 466 is adjacent to the second receiving space 404 and nearer to the battery cavity 206 than the second fixing hole 464. The top of the sidewall 30 defines a bar-shaped stopper portion 48 received in the first receiving space 402.

The second receiving space 404 includes a first opening 4042 and a second opening 4044 above the first opening 4042. The first opening 4042 is wider than the second opening 4044.

The sidewall 32 defines a latching groove 322 to receive one end of the hook 142 to latch the cover 14 to the main body 12.

Figure 4:
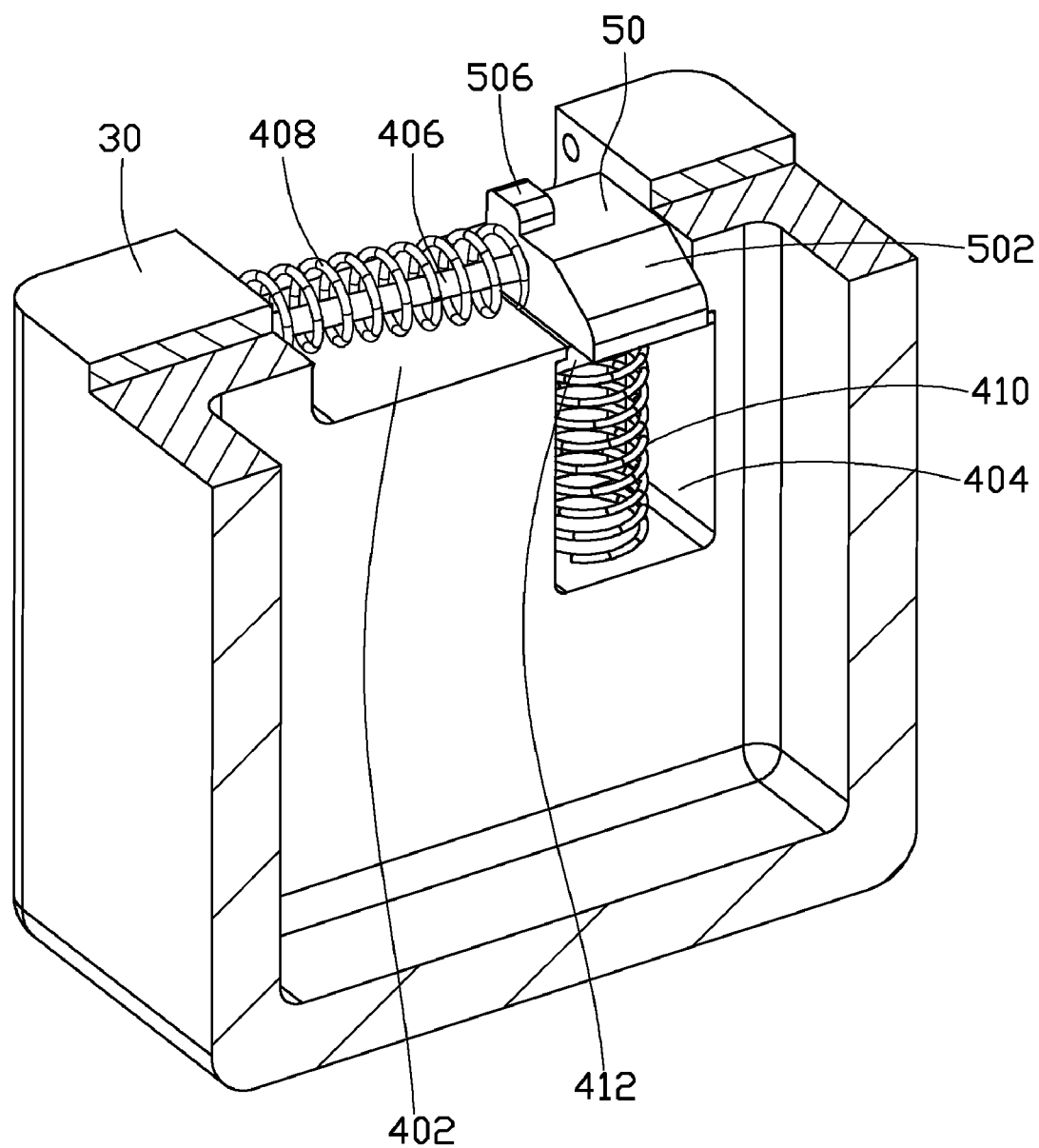
FIG. 4 is another cut-away view of the main body of the battery box of FIG. 1, showing a battery mounting mechanism mounted in the main body.

Referring also to FIG. 4, the battery box 10 further includes a battery mounting mechanism 40 mounted in the main body 12. The mechanism 40 includes a fixing member 50, a shaft 406, elastic members 408 and 410, and a plate 412. In this embodiment, the elastic members 408 and 410 are coil springs.

The fixing member 50, the shaft 406, and the elastic member 408 are received in the first receiving space 402. The elastic member 408 is arranged around the shaft 406. Two opposite ends of the shaft 406 are respectively received in the second fixing hole 464 and the third fixing hole 466. The fixing member 50 is adjacent to the third fixing hole 466. In this embodiment, the fixing member 50 defines a through hole 504. The shaft 406 extends through the through hole 504 to allow the fixing member 50 to rotate relative to the shaft 406. The fixing member 50 includes an inclined surface 502 inclining toward the battery cavity 206 and a portion of the inclined surface 502 is received in the battery cavity 206. A latching protrusion 506 protrudes from the top of the fixing member 50 and hooks on the stopper portion 48.

The elastic member 410 and the plate 412 are received in the second receiving space 404. The elastic member 410 is perpendicularly received in the second receiving space 404 and resists the plate 412. In this embodiment, the plate 412 includes a first portion 4122 and a second portion 4124. The first portion 4122 and the second portion 4124 are substantially rectangular. The first portion 4122 is received in the first opening 4042, and the second portion 4124 is received in the second opening 4044. The width and the height of the second portion 4124 are the same as that of the second opening 4044. The first portion 4122 is wider than the second opening 4044 and narrower than the first opening 4042.

Figure 6:
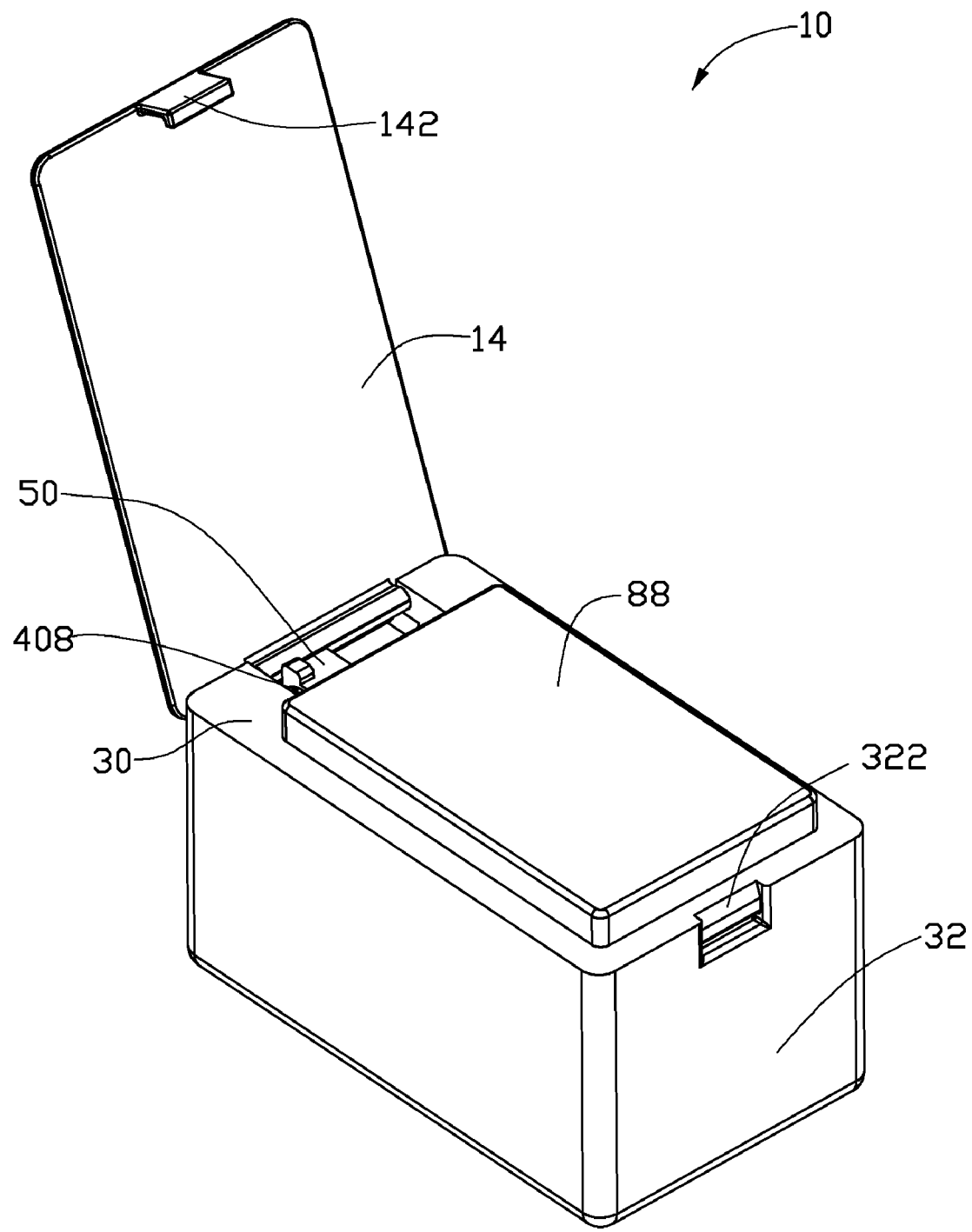
FIG. 6 is an isometric view of the battery box of FIG. 1, showing the battery in a released state.

Referring also to FIG. 6, when mounting the battery 88 in the battery cavity 206, the battery 88 is pressed downward to resist the inclined surface 502 of the fixing member 50, causing the fixing member 50 to rotate until the inclined surface 502 moves out of the battery cavity 206. At this point, the battery 88 can be further pressed downward until the battery 88 is received in the battery cavity 206. During the rotation of the fixing member 50, the fixing member 50 presses the plate 412, causing the plate 412 to press against and press the elastic member 410. When the battery 88 is received in the battery cavity 206, the fixing member 50 is released, and the elastic member 410 rebounds to push the plate 412, causing the fixing member 50 to rotate to its original state. At this point, the latching protrusion 506 hooks on the stopper portion 48, the fixing member 50 presses the battery 88, and the battery 88 is thus fixed in the battery cavity 206. When the battery 88 is fixed in the battery cavity 206, the elastic members 202 are compressed. The cover 14 can be then latched to the main body 12 to close the battery box 10.

Referring also to FIG. 6, to take out the battery 88, the battery box 10 is opened, and the fixing member 50 is pushed toward the elastic member 408 to cause the elastic member 408 to be compressed. As the second fixing hole 464 is further from the battery cavity 206 than the third fixing hole 466, the fixing member 50 moves out of the battery cavity 206 when it is pushed toward the elastic member 408. When the fixing member 50 moves out of the battery cavity 206, the battery 88 is released, thus the elastic members 202 rebound to push the battery 88 upward until a portion of the battery 88 moves out of the battery cavity 206. At this point, the battery 88 can be manually grasped and taken out from the battery cavity 206. When the fixing member 50 is released, the elastic member 408 rebounds to cause the fixing member 50 to return to its original state.

With such configuration, even if the battery box 10 is accidentally opened, the battery 88 cannot automatically pop out of the battery box 10, thus avoiding damage to the battery 88 and an electronic device using the battery box 10.

Figure 7:
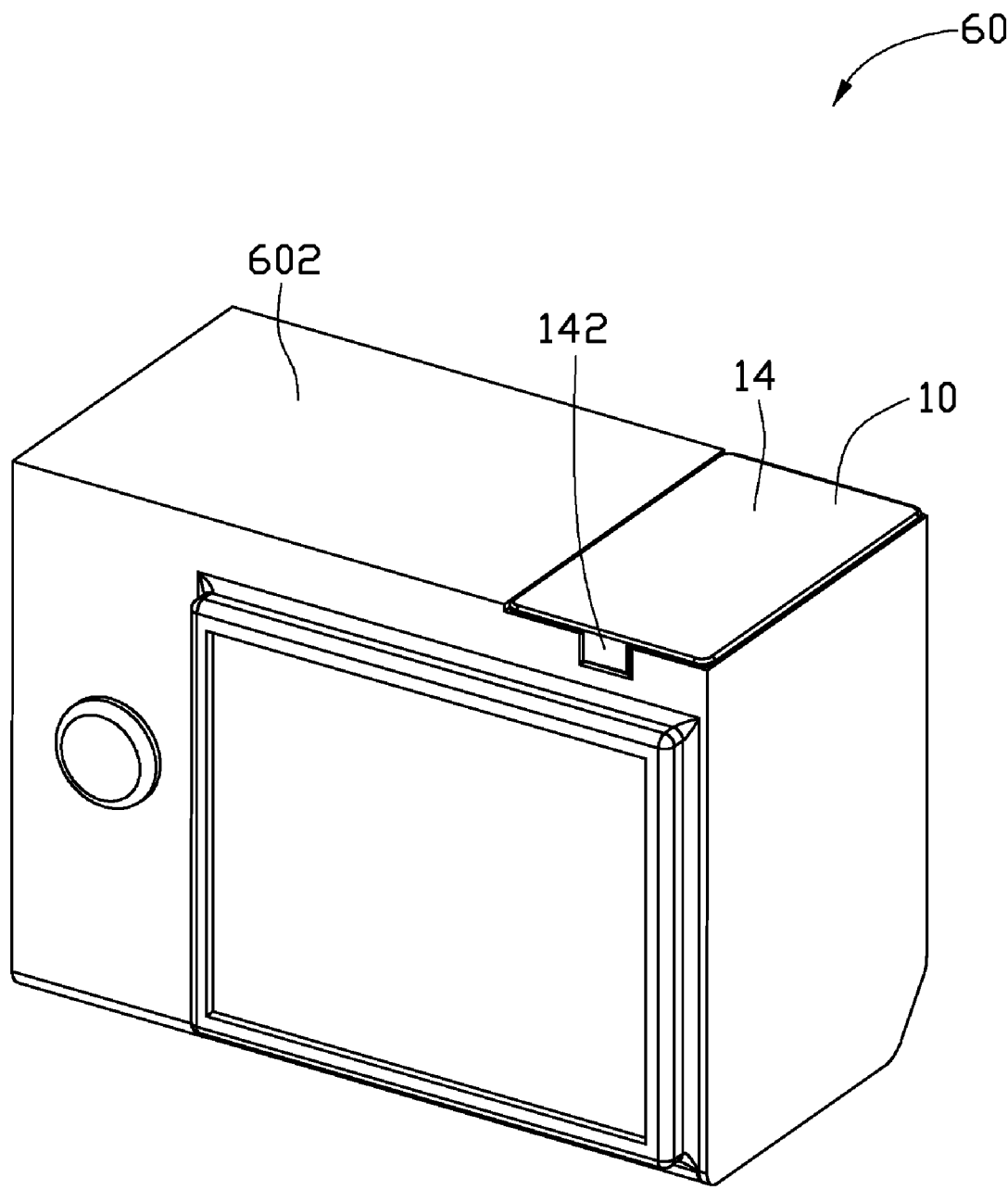
FIG. 7 is an isometric view of the battery box of FIG. 1 applied in an electronic device in accordance with an exemplary embodiment.

Referring also to FIG. 7, an embodiment of an electronic device 60 using the battery box 10 is illustrated. The battery box 10 is mounted in a housing 602 of the electronic device 10. The cover 14 and the hook 142 of the battery box 10 are exposed from the housing 602 for easy operation.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A battery box, comprising:
a main body defining a battery cavity and comprising a sidewall, the battery cavity receiving a battery and comprising a bottom, the sidewall defining a first receiving space and a second receiving space communicating with the first receiving space, the first receiving space being substantially parallel to the bottom of the battery cavity and the second receiving space being substantially perpendicular to the bottom of the battery cavity, and a top of the sidewall defining a stopper portion received in the first receiving space; and
a battery mounting mechanism, comprising:
a shaft comprising two opposite ends fixed in the first receiving space, one end of the shaft adjacent to the second receiving space being nearer to the battery cavity than the other end of the shaft;
a fixing member rotatable relative to and slidable along the shaft and engaging with the stopper portion, the fixing member being adjacent to the second receiving space and a portion of the fixing member being received in the battery cavity; and
a first elastic member substantially perpendicularly received in the second receiving space;
wherein when the battery is pressed toward the bottom of the battery cavity, the portion of the fixing member received in the battery cavity is pressed by the battery, causing the fixing member to rotate until the fixing member moves out of the battery cavity, during the rotation of the fixing member, the first elastic member is compressed, and when the fixing member moves out of the battery cavity, the battery is further pressed until the battery is received in the battery cavity, when the battery is received in the battery cavity, the first elastic member rebounds to cause the fixing member to return to its original state, thus the fixing member hooks on the stopper portion and presses the battery to fix the battery in the battery cavity; when the fixing member is pushed to slide away from the second receiving space along the shaft until the fixing member moves out of the battery cavity, the battery is released and is able to be taken out of the battery cavity.

2. The battery box as described in claim 1, wherein the battery mounting mechanism further comprises a second elastic member arranged around the shaft, when the fixing member is pushed away from the second receiving space, the second elastic member is compressed, and when the fixing member is released, the second elastic member rebounds to cause the fixing member to return to its original state.

3. The battery box as described in claim 1 further comprising at least one third elastic member substantially perpendicularly mounted on the bottom of the battery cavity, wherein when the battery is received in the battery cavity, the at least one third elastic member is compressed, and when the battery is released, the at least one third elastic member rebounds to push the battery until a portion of the battery moves out of the battery cavity.

4. The battery box as described in claim 1, wherein the battery mounting mechanism further comprises a plate received in the second receiving space and resisted by the first elastic member, when the fixing member rotates, the fixing member presses the plate to cause the first elastic member to be compressed.

5. The battery box as described in claim 4, wherein the second receiving space comprises a first opening and a second opening above the first opening, a width of the first opening is greater than that of the second opening, the plate comprises a first portion and a second portion, the first portion is received in the first opening, and the second portion is received in the second opening, the width and the height of the second portion are the same as that of the second opening.

6. The battery box as described in claim 1, wherein the fixing member comprises an inclined surface inclining towards the bottom of the battery cavity, and a portion of the inclined surface is received in the battery cavity.

7. An electronic device, comprising:
a housing; and
a battery box received in the housing, comprising:
a main body defining a battery cavity and comprising a sidewall, the battery cavity receiving a battery and comprising a bottom, the sidewall defining a first receiving space and a second receiving space communicating with the first receiving space, the first receiving space being substantially parallel to the bottom of the battery cavity and the second receiving space being substantially perpendicular to the bottom of the battery cavity, and a top of the sidewall defining a stopper portion received in the first receiving space; and
a battery mounting mechanism, comprising:
a shaft comprising two opposite ends fixed in the first receiving space, one end of the shaft adjacent to the second receiving space being nearer to the battery cavity than the other end of the shaft;
a fixing member rotatable relative to and slidable along the shaft and engaging with the stopper portion, the fixing member being adjacent to the second receiving space and a portion of the fixing member being received in the battery cavity; and a first elastic member substantially perpendicularly received in the second receiving space;

wherein when the battery is pressed toward the bottom of the battery cavity, the portion of the fixing member received in the battery cavity is pressed by the battery, causing the fixing member to rotate until the fixing member moves out of the battery cavity, during the rotation of the fixing member, the first elastic member is compressed, and when the fixing member moves out of the battery cavity, the battery is further pressed until the battery is received in the battery cavity, when the battery is received in the battery cavity, the first elastic member rebounds to cause the fixing member to return to its original state, thus the fixing member hooks on the stopper portion and presses the battery to fix the battery in the battery cavity; when the fixing member is pushed to slide away from the second receiving space along the shaft until the fixing member moves out of the battery cavity, the battery is released and is able to be taken out of the battery cavity.

8. The electronic device as described in claim 7, wherein the battery mounting mechanism further comprises a second elastic member arranged around the shaft, when the fixing member is pushed away from the second receiving space, the second elastic member is compressed, and when the fixing member is released, the second elastic member rebounds to cause the fixing member to return to its original state.

9. The electronic device as described in claim 7, wherein the battery box further comprises at least one third elastic member substantially perpendicularly mounted on the bottom of the battery cavity, when the battery is received in the battery cavity, the at least one third elastic member is compressed, and when the battery is released, the at least one third elastic member rebounds to push the battery until a portion of the battery moves out of the battery cavity.

10. The electronic device as described in claim 7, wherein the battery mounting mechanism further comprises a plate received in the second receiving space and resisted by the first elastic member, when the fixing member rotates, the fixing member presses the plate to cause the first elastic member to be compressed.

11. The electronic device as described in claim 10, wherein the second receiving space comprises a first opening and a second opening above the first opening, a width of the first opening is greater than that of the second opening, the plate comprises a first portion and a second portion, the first portion is received in the first opening, and the second portion is received in the second opening, the width and the height of the second portion are the same as that of the second opening.

12. The electronic device as described in claim 7, wherein the fixing member comprises an inclined surface inclining towards the bottom of the battery cavity, and a portion of the inclined surface is received in the battery cavity.

* * * * *